United States Patent [19]
Yoshida

[11] 3,958,518
[45] May 25, 1976

[54] INCINERATOR FOR OIL-CONTAINING WASTE SLUDGE AND METHOD THEREOF

[75] Inventor: Masaharu Yoshida, Hirakata, Japan

[73] Assignees: Sunray Reinetsu Co., Ltd., Hirakata; Sumitomo Electric Industries, Ltd., Osaka, both of Japan

[22] Filed: Nov. 18, 1974

[21] Appl. No.: 524,909

[30] Foreign Application Priority Data
Nov. 16, 1973   Japan.............................. 48-129481

[52] U.S. Cl.............................. 110/7 S; 110/165 R; 110/7 B
[51] Int. Cl.² ........................ F23G 7/00; F23J 1/00
[58] Field of Search............. 110/7 R, 7 B, 7 S, 8 R, 110/165 R

[56] References Cited
UNITED STATES PATENTS

| | | | |
|---|---|---|---|
| 2,535,730 | 12/1950 | Gadret | 110/7 |
| 2,537,467 | 1/1951 | Komline | 110/7 |
| 2,891,493 | 6/1959 | Gram, Jr. et al. | 110/165 |
| 3,133,804 | 5/1964 | Hardgrove | 110/165 |
| 3,357,375 | 12/1967 | Brophy | 110/7 |
| 3,738,289 | 6/1973 | Hanway, Jr. | 110/7 |
| 3,741,136 | 6/1973 | Stookey | 110/165 |
| 3,822,653 | 7/1974 | Ghelfi | 110/7 |

*Primary Examiner*—Kenneth W. Sprague
*Attorney, Agent, or Firm*—Sughrue, Rothwell, Mion, Zinn & Macpeak

[57] ABSTRACT

Incinerator for oil-containing waste sludges having a furnace, a tank for mixing and stirring the oil-containing waste sludges and oil such as fuel oil or waste oil, a burner for spraying and incinerating the mixture into said furnace, a gas duct containing, if required, heat exchanger means at its midway and a flue, characterized in that said furnace is composed of two chambers, the upper being a combustion chamber, with an opening for spraying and burning said mixture by means of said burner mounted within said opening thereby rendering the waste sludges into a semi-molten state, and the lower chamber being a settling chamber, with a gas duct for discharging combustion gas and an opening for the recovery of clinker form ashes, for settling the clinker ashes contained in the combustion gas, said combustion chamber and said settling chamber being connected by a throttle portion for causing the semi-molten fine particles from the waste sludges to aggregate with each other into clinker form having fine pores between aggregated particles.

6 Claims, 1 Drawing Figure

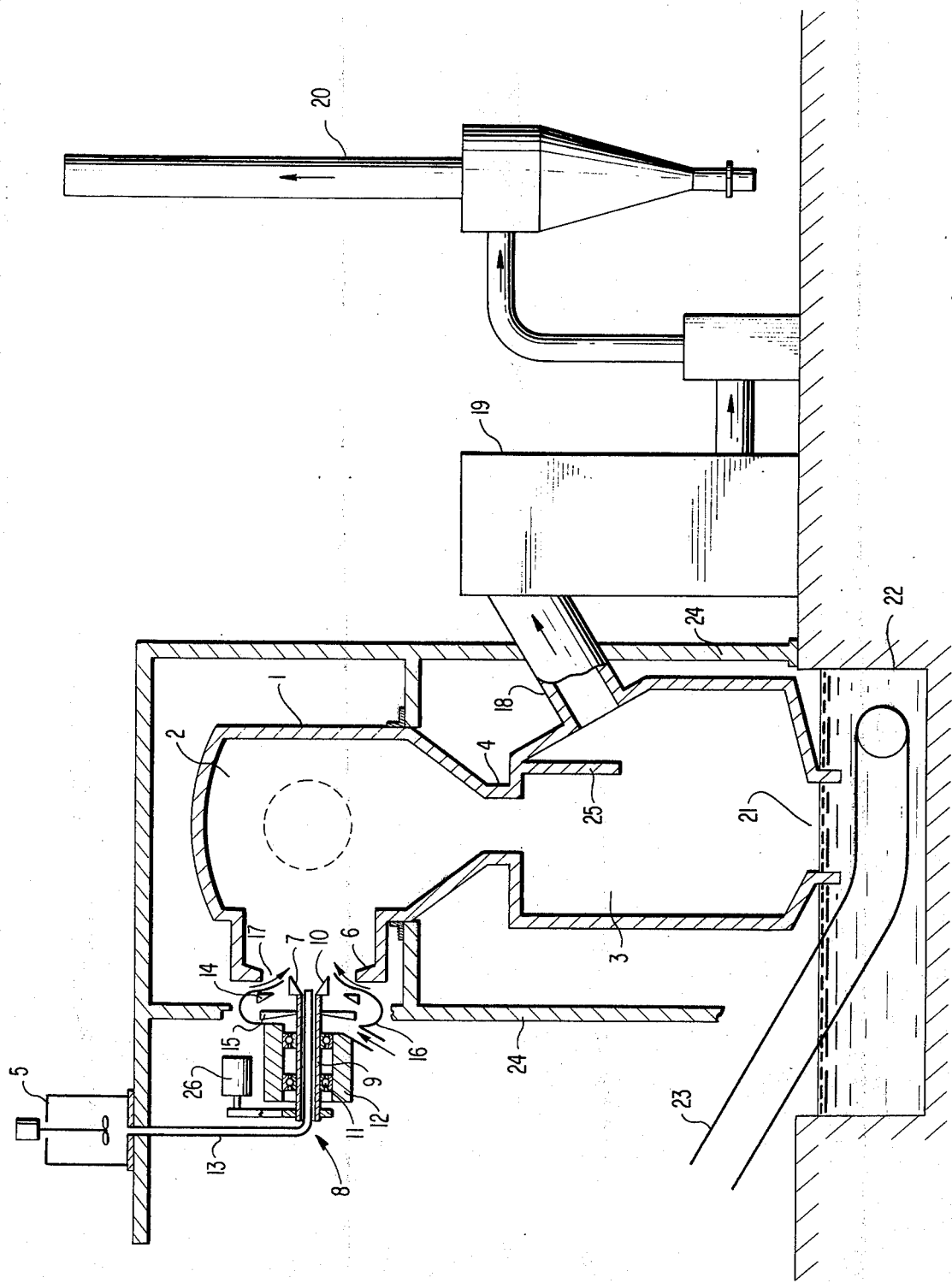

INCINERATOR FOR OIL-CONTAINING WASTE SLUDGE AND METHOD THEREOF

BACKGROUND OF THE INVENTION

1. Field of the Invention

This invention relates to incinerators for oil-containing sludges and incineration methods therefor.

It is well-known to use activated white clay in the purification of edible oils, petroleum and the like but the conventional methods heretofore proposed for the treatment of the wasted sludges containing oil have not yet been quite satisfactory.

Wasted white clay after the use generally takes the form of slurry containing oils, swells by the absorption of water if left as it is and does not solidify like ordinary mud even if exposed to the sun light. Therefore, it cannot be utilized for land reclamation or left as it is. Moreover, such type of sludge may even cause spontaneous combustion if it is left for a long time while exposed to the sun.

In order to overcome these problems, it has been proposed to burn and remove the oil contents in the waste sludge. In the combustion of waste white clay containing oils, the crystal structure of the activated white clay is destroyed by the heating to approximately above 600°C and, thereafter, the white clay loses its water absorption property and, hence, aforesaid tendency of swelling due to the water absorption. The waste white clay leaves, after the burning, ash components containing silica, alumina, trace amount of iron oxides, etc. which can be utilized as the aggregate material for fire-proof buildings.

2. Description of the Prior Art

Conventional incinerators, for example, multi-tray type, rotary kiln type, stepped bed type and the like can generally be employed for continuous combustion but, since the waste white clay is composed of fine powder and contains oil contents therein, it takes much time to heat the clay to a desired temperature, and therefore the incineration is time consuming and inefficient. In addition, continuous incineration operation at higher temperatures above 600°C is rather difficult because of the structure of the furnaces, which results in unburned portions in the incineration ash to produce a somewhat black powder. Although several other methods have been proposed such as a method of incinerating the waste white clay by spraying, or a method of using a fluidized bed incinerator in which the waste clay is fluidized together with sand, or a method by way of liquefying and atomizing the clay, all of these methods are defective in that complete combustion is difficult and finely powdered ashes are produced resulting in fine dust in the exhaust gas, and are thus inconvenient to be disposed with. In addition, they have an disadvantage that the waste white clay is melted at temperatures above 900°C in the incineration operation and deposited onto the surface of the furnace wall to damage the furnace thereby hindering the continuous incineration.

SUMMARY OF THE INVENTION

This invention intends to overcome the defects of the conventional incinerators for oil-containing sludges such as the foregoing oil-containing waste white clay.

A first object of this invention is, therefore, to provide an incinerator in which clinker form ash can be produced.

A second object of this invention is to provide an incinerator capable of sequentially taking out the produced ash.

A third object of this invention is to provide an incinerator capable of preventing the ash from being discharged together with exhausted gas from the flue.

One of the important features of the incinerator according to this invention resides in the structure of an incinerator furnace composed of an upper chamber and a lower chamber connected by way of a throttle portion, the upper chamber being a combustion chamber having an opening (or openings) for spraying, in vaporized form into the chamber, a liquid formed by mixing and stirring at least the oil-containing waste sludges and fuel oils and burning the same, the lower chamber being a settler chamber having a gas duct for exhausting the combustion gas and an opening for taking out clinker form ashes. The feature of the method according to this invention resides in burning the vaporized liquid in such a way as to completely incinerate the oil contents while heating the sludge contents finely powdered by said vaporization to a semimolten state.

BRIEF DESCRIPTION OF THE DRAWING

The single FIGURE is an elevational view partially in section of an embodiment of the incinerator for carrying out the method according to this invention.

DETAILED DESCRIPTION OF THE PREFERRED EMBODIMENT

This invention is to be described in detail by way of a preferred embodiment thereof referring to the accompanying drawing, wherein reference numeral 1 denotes a furnace body of the incinerator. The furnace 1 is composed of an upper chamber 2 and a lower chamber 3 connected by way of a throttle portion 4 and supported by a plurality of support legs 24. The inner wall of the furnace 1 is lined with fire bricks. The upper chamber 2 has at its side an opening 7 which is provided with a burner tile 6 consisting of fire bricks. A spray type rotary burner 8 is mounted to said opening 7 for vaporizing the mixture of oil-containing waste white clay and fuel oil (for instance, heavy oil) and discharging the same to the center of the furnace. A pressure spray type burner can also be used for this purpose but the rotary spray type is preferred since the clogging of the mixture comprising the oil-containing white clay does not occur in the latter type.

The rotary type burner has the structure as described below. A bearing 11 receives a hollow rotary shaft 9 the top of which is attached with a vaporization cup 10 divergent to the furnace. The hollow rotary shaft 9 integrated with the vaporization cup 10 is rotated by an independent driving power source 26. 13 denotes a supply pipe for feeding the liquid mixture of oil-containing waste sludges and the fuel oils into the rotary shaft 9. This liquid mixture is fed from a mixing and stirring tank 5 by way of pump means or due to the pressure difference. 14 is a fixed flow guide plate and 15 is a fan secured to the hollow rotary shaft 9 for assisting the vaporization of said liquid mixture.

For bearing 11 for the rotary shaft, and fan 15 and flow guide plates 14, covers 12 and 16 are respectively provided, and openings for the ventilation of combustion air 17 are disposed between said covers 16 and the opening 7 in the cover of the upper chamber 2.

The upper shoulder of the lower chamber 3 extends to a gas duct 18 that projects therefrom, upwardly and sideways. The combustion gas is carried through said duct 18 to a chamber 19 including heat exchanger means and then exhausted from a flue 20 as shown in the arrow. An ash draining portion 21 is provided at the bottom of the lower chamber 3. A water tank 22 is disposed under the ash draining portion 21 and the lower end of said portion 21 is immersed into water in the water tank 22 and sealed with water. A conveyor 23 is provided for recovering the ash from the water tank 22.

In carrying out the process of this invention employing the foregoing incinerator, waste sludges such as oil-containing white clay and heavy oil (may be wasted oil) are mixed in a ratio of about 2:1 by weight in the mixing and stirring tank 5 and stirred to form a homogeneous liquid mixture. When the homegeneous mixture can not easily be obtained depending upon the natures of the sludges, the stirring under heating is effective to obtain such uniform mixture. In a preferred practice, if desired, ordinary heavy oil can be fed at first through the feed pipe 13, vaporized and sprayed into the furnace by way of the rotation of the vaporization cup 10 and burned thereby sufficiently raising the furnace temperature previously. Then, the flow of said heavy oil is switched to that of the liquid mixture comprising oil-containing sludges and the heavy oil (which may be wasted oil) and the burning is started again. The liquid mixture is vaporized and discharged due to the rotation of the vaporization cup 10 and the combusible oils therein are burnt.

In the course of burning, the oil contents and other combusible components in the oil-containing waste sludges that are finely atomized in the high temperature atmosphere are completely incinerated, while the unburnable wasted sludge contents are heated to semi-molten state. Parts of the molten sludges collide the furnace wall and gradually fall while growing into larger clinkers and other parts enter the lower chamber while floating in air.

When the finely pluverized semi-molten sludges are passed through the throttle portion 4 that connects the upper chamber 3 and the lower chamber 4, the fine unburnable particles coagulate to each other gradually growing into corser particles and, through further aggregation, into clinker form having fine pores between particles. Without the provision of such throttle portion 4, the fine powders would not grow into a clinker through aggregation and there would be few occasions for them to collide with the wall to grow.

When the fine particles pass through the throttle portion 4 and arrive at the lower chamber, they rapidly lose the speed and spontaneously fall by the gravity to the bottom of the lower chamber 3 gradually, while only the exhaust gas escapes to the gas duct 18. Without such narrowed throttle portion 4, again, much of the ash contents would be discharged into surrounding air together with the exhaust gas.

It is, of course, required in the incineration process above to select the mixing ratio of oil-containing wasted sludge and heavy oil within an appropriate range and raise the combustion temperature to a required level in order to heat the wasted sludges nto a semi-molten state. Since the furnace is composed of two, upper and lower, chambers separated from each other and the heating is effected only to the small upper chamber in this invention, fuel oil with lower heating calories can be used and, hence, the operation cost is reduced. Clinker ashes are taken out from the ash draining portion 21.

In a preferred embodiment of this invention, suitable temperatures for the upper chamber lie within a range of 1,000°C – 1,200°C and under such temperatures, the ashes fall down in the lower chamber 3 forming clinkers about in the size of 5 × 5 × 5 cm to 5 × (2 – 3) × (2 – 3) cm in volume. With the temperatures above 1,600°C, the sludges are melted into a glassy state and firmly adhered to the furnace wall.

Since the ashes are formed in clinker form in this invention as described above, they are very convenient for recovery and transportation.

The upper chamber may be of a spontaneous ventilation type, but it is preferred to employ compulsory ventilation type, for this provides higher furnace temperature to facilitate the melting of the waste sludges. To attain said pressurized combustion in the invention, the ash draining portion 21 of the settling chamber 3 is sealed with water by the water tank 22 as described above. For reducing the amount of ash discharged from the flue in this invention, the lower chamber has desirably a greater chamber space than that of the upper chamber. Since ashes lose the speed and settle in the bottom of the lower chamber 3 provided with the ash draining portion, the ratio of chamber volumes of the upper chamber and the lower chamber are usually determined within the range of 1:1 to 1:2 considering the stalling effect and costs. Too large lower chamber will be uneconomic and it is illustratively determined as about one and one-half times in volume of the upper chamber. For the easier increase of the temperature in the combustion chamber, it is preferred that the throttle portion has smaller cross section but a too small throttle section may cause excess agglomeration of clinkers and result in clogging. The provision of baffle plates 25 that extend from the upper part of the lower chamber between the throttle portion 4 of the lower chamber 3 and a gas duct portion 18 provided at the shoulder of said chamber can prevent the fine dust from flowing into the flue together with the exhaust gas as much as possible. In a preferred practice of this invention, oil-containing activated white clay is incinerated in such a manner that only the oil contents in the white clay is incinerated at about 700°–900°C of the upper chamber temperature at the starting of the incineration operation, while the white clay is left not melted and deposited as fine dust on the wall of the upper chamber. Then, when the temperature is increased thereafter to render the white clay semi-molten, fine particles of molten white clay do not adhere to the brick wall but fall while aggregating with each other to grow into clinker form.

In the upper chamber, two units of rotary burners may be provided for increasing the incineration power, wherein it is desirable to dispose the two burners in such a manner that the tops of the flames of these burners intersect with each other at the center of the upper chamber. This arrangement is similarly applicable where three or more units are mounted.

This invention has been described for the application to the activated white clay as wasted sludges, but it is of course applicable also to the incineration of various other wasted sludges of the absorbents utilized for the purification of oils such as, for example, activated bauxite, acidic white clay, and the like that can be melted and formed into the clinker form.

What is claimed is:

1. In an incinerator for oil-containing waste sludge including a furnace, a tank for mixing and stirring the oil-containing waste sludge and oil such as fuel oil or waste oil, at least one burner connected to said tank and receiving said mixture for spraying and incinerating the mixture in said furnace, a gas duct and a flue, the improvement wherein: said furnace is composed of upper and lower chambers, the upper chamber being a combustion chamber with an opening therein, said burner being mounted within said opening for spraying and burning said mixture within said upper chamber to burn the burnable contents of the waste sludge and to render the unburnable contents of the waste sludge into a semi-molten state, said lower chamber being a settling chamber for settling the clinker ashes contained in the combustion gas, a gas duct opening into said lower chamber for discharging combustion gas and an opening within the lower chamber for the recovery of clinker form ashes, and a throttle portion at the lower end of said combustion chamber for connecting said combustion chamber to said settling chamber for causing the semi-molten fine unburnable particles from the waste sludge to aggregate with each other into clinker form having fine pores between the aggregated particles.

2. The incinerator for oil-containing waste sludges as defined in claim 1, wherein the capacity of the settling chamber is greater than that of the combustion chamber so that the clinker ashes having fine pores formed in said throttle portion by the aggregation of the fine semi-molten particles from the waste sludges may lose the speed and settle down in the settling chamber.

3. The incinerator for oil-containing waste sludges as defined in claim 1, wherein a barrier plate is provided in front of said gas duct mounted to said settling chamber for preventing fine dust from flowing out of said lower chamber.

4. The incinerator for oil-containing waste sludges as defined in claim 1, wherein said opening for the recovery of the clinker ashes is sealed with water so that the pressurized combustion can be achieved.

5. The incinerator for oil-containing waste sludges as defined in claim 1, wherein the capacity of the settling chamber is greater than that of the combustion chamber so that the clinker ashes having fine pores formed in said throttle portion by the aggregation of the fine semi-molten particles from the waste sludges may lose speed and settle down in the settling chamber, and wherein a barrier plate is provided in front of said gas duct mounted to said settling chamber for preventing fine dust from flowing out and said opening for the recovery of the clinker ashes is sealed with water so that the pressurized combustion can be achieved.

6. A method of incinerating oil-containing waste sludges in an incinerator, said method comprising: spraying and burning a mixture of oil and waste sludge in a combustion chamber in such a manner that the oil and other burnable contents of the waste sludge are burned by heat due to the burning of said oil and other burnable contents, and unburnable fine particles from the waste sludge are incinerated to such an extent that they are rendered into a semi-molten state, causing the semi-molten fine particles to aggregate with each other into clinker form having fine pores between aggregated particles in a throttle portion of said furnace leading to a settling chamber beneath said furnace, causing the clinkers in the throttle portion of said furnace to settle down into the settling chamber, taking out the clinkers from the bottom opening of the settling chamber and discharging waste gas from combustion through a gas duct within said settling chamber.

* * * * *